United States Patent [19]

Cimini, Jr. et al.

[11] Patent Number: 5,023,947
[45] Date of Patent: Jun. 11, 1991

[54] OPTICAL EQUALIZATION RECEIVER FOR LIGHTWAVE COMMUNICATION SYSTEMS

[75] Inventors: Leonard J. Cimini, Jr., Howell; Larry J. Greenstein, Edison; Adel A. M. Saleh, Holmdel, all of N.J.

[73] Assignee: AT&T Bell Laboratories, Murray Hill, N.J.

[21] Appl. No.: 430,041

[22] Filed: Nov. 1, 1989

[51] Int. Cl.$^5$ ............................................ H04B 10/06
[52] U.S. Cl. .................................... 455/619; 356/352
[58] Field of Search ............... 455/600, 606, 607, 609, 455/610, 611, 612, 613, 619; 370/3; 356/352; 350/96.15, 96.3

[56] References Cited

U.S. PATENT DOCUMENTS 4,742,576 5/1988 McMahon .............................. 370/3
4,839,614 6/1989 Hill ....................................... 370/3

OTHER PUBLICATIONS

K. D. Li, et al., "Broadband Cubic-Phase Compensation With Resonant Gires-Tournois Interferometers", Optics Letters, vol. 14, No. 9, May 1, 1989, pp. 450–452.
N. A. Olsson, et al., "16 Gbit/s, 70 km Pulse Transmission by Simultaneous Dispersion and Loss Compensation with 1.5 $\mu$m, Optical Amplifiers", Electronics Letters, vol. 25, No. 9, Apr. 27, 1989, pp. 603–605.
P. Di Vita, et al., "Optical Equalizers for Multimode Optical Fibres", CSELT Rapporti Tecnici–N. 3–Sep. 1976, pp. 159–164.
N. Takachio, et al., "Chromatic Dispersion in an 8 Gbit/s 202 km Optical CPFSK Transmission Experiment", Integrated Optics and Optical Fiber Communications Conference, Jul. 1989, Japan.
D. Marcuse, "Equalization of Dispersion in Single-Mode Fibers", App. Opt. vol. 20 No. 4, Feb. 15, 1981, pp. 696–700.
D. Leclerc, et al., "Chirping, Intersymbol Interferences and Pulse Shaping in Injection Lasers", IOOC-ECOC '85, pp. 775–778.

Primary Examiner—Reinhard J. Eisenzopf
Assistant Examiner—L. Van Beek
Attorney, Agent, or Firm—Gregory C. Ranieri

[57] ABSTRACT

An optical equalization receiver for countering the effects of delay distortion is realized by utilizing dynamically controllable Fabry-Perot etalon structures. By dynamically adjusting the frequency response of an etalon that is in a feedback loop configuration, the associated delay characteristic of the etalon may be used to counter the effects of delay distortion, thereby allowing higher transmission rates and transmission distances to be achieved. In one exemplary embodiment, an optical receiver comprising a reflective Fabry-Perot etalon and a piezoelectric transducer is used in a feedback loop configuration wherein a feedback control circuit monitors an output signal from the etalon for generating a control signal representing the amount of delay needed to compensate for distortion in an optical signal incident on the etalon. Specifically, the control signal causes a change in the optical path length of the etalon that results in a shift in its frequency response for producing a delay substantially equal and opposite to the associated delay distortion.

14 Claims, 10 Drawing Sheets

OPTICAL EQUALIZATION RECEIVER FOR LIGHTWAVE COMMUNICATION SYSTEMS

TECHNICAL FIELD

This invention relates to the field of lightwave systems for dispersion equalization in which the system compensates for the effects of dispersion within a transmission medium.

BACKGROUND OF THE INVENTION

The effects of delay distortion, specifically those associated with fiber chromatic dispersion, have limited bit rates and repeater spans of conventional lightwave communication systems. The underlying mechanism that causes this limitation is intersymbol interference. In addition, direct modulation of single-longitudinal mode semiconductor lasers causes a transient wavelength chirping (laser chirp), which in combination with the chromatic dispersion of the fiber, causes increased intersymbol interference. Laser chirp alone has no deleterious effect on direct detection optical links unless there is dispersion in the transmission medium, while fiber dispersion alone, with no laser chirp present, can still limit the bit rate and repeater span resulting from associated intersymbol interference. The effects of laser chirp combined with fiber dispersion are discussed in articles by P. J. Corvini et al., *J. Lightwave Tech.*, Vol. LT-5, No. 11 pp. 1591-5 (1987), D. A. Atlas et al., *Optics Lett.*, Vol. 13, No. 11, pp. 1035-7 (1988), and J. C. Cartledge et al., *J. Lightwave Tech.*, Vol. 7, No. 3, pp. 568-73 (1989). Further, the effects of fiber dispersion alone are discussed, for example, in the article by A. F. Elrefaie et al., *J. Lightwave Tech.*, Vol. 6, No. 5, pp 704-6 (1988).

With the trend toward higher bit rates and longer repeater spans, various equalization techniques have been proposed to reduce the effects of laser chirp. Approaches include use of optical pulse shaping and external modulation techniques. See, D. Le Clerc et al., *Proceedings of 1985 IOOC-ECOC*, pp. 775-8. Additionally, techniques employing semiconductor laser amplifiers have been used to impose a chirp on a transmitted optical signal to counteract the combined effects of fiber dispersion and laser chirp. See, N. A. Olsson et al., *Electron. Lett.*, Vol. 25, No. 9 pp. 603-5 (1989).

The above approaches attempt to reduce the effects of laser chirp directly at the transmitter source, i.e., the laser. An alternative approach focuses on reducing the resulting effects of dispersion directly at the receiver by utilizing a transmission medium having a strong chromatic dispersion opposite to that of the transmission fiber. Particularly, singlemode fibers, dispersive gratings and optical tapped delay lines have been demonstrated to reduce the effects of laser chirp and fiber dispersion. See, D. Marcuse, *Appl. Optics*, Vol. 20, No. 4 pp. 696-9 (1981) and L. B. Jeunhomme, *Single Mode Fiber Optics*, pp. 213-5 (1983).

In all of the approaches above relating to equalization, there exist problems in achieving low optical power penalty while maintaining low cost and simplicity.

SUMMARY OF THE INVENTION

An optical equalization receiver for countering the effects of delay distortion, specifically fiber chromatic dispersion, is realized by utilizing dynamically controllable Fabry-Perot etalon structures. By dynamically adjusting the frequency response of an etalon that is in a feedback loop configuration, the associated time delay characteristic of the etalon may be used to counter the effects of delay distortion relating to the fiber chromatic dispersion, thereby allowing higher transmission bit rates or longer transmission distances to be achieved.

In one exemplary embodiment, an optical receiver comprising a reflective Fabry-Perot etalon and a piezoelectric transducer for dynamically controlling the optical path length of the etalon are used in a feedback loop configuration wherein a feedback circuit monitors an output optical signal from an end of the etalon for generating a control signal representing the amount of delay needed to compensate for distortion in an optical signal incident on the etalon. Specifically, the control signal causes a change in the optical path length of the etalon that results in a shift of the frequency response of the etalon for producing a delay characteristic substantially equal and opposite to the associated delay distortion of the transmission medium.

Various feedback control strategies may be used in adjusting the frequency response of the etalon so as to obtain a delay characteristic substantially equal and opposite delay to the associated delay distortion. For instance, in return-to-zero signaling, the etalon frequency response may be adjusted in real time so as to maximize the sinusoidal amplitude component of the detected optical signal at the frequency of the signaling bit-rate. Further, for both return-to-zero and non-return-to-zero signaling, another feedback control strategy is to adjust the frequency response of the etalon such that the "eye opening" of the detected optical signal is maximized.

In accordance with the principles of the invention, the frequency response of the etalon may be adjusted in accordance with the above feedback strategies by changing the optical path length of the etalon, such as by varying the cavity length of the etalon, or by inducing a change in the refractive index of the optical medium enclosed within the cavity of the etalon.

BRIEF DESCRIPTION OF THE DRAWING

The invention will be more readily understood after reading the following detailed description of specific illustrative embodiments of the invention in conjunction with the appended drawings wherein.

DETAILED DESCRIPTION

A lightwave receiver that compensates for delay distortion in lightwave communication systems is realized by employing a dynamically controllable Fabry-Perot etalon structure. The present invention is based upon the discovery that Fabry-Perot etalons may be used to counteract the effects of fiber dispersion, which effects can be particularly deleterious for optical signals with laser chirp. Specifically, fiber is observed to have a frequency response constant in amplitude and linear in time delay, with a slope polarity that depends on wavelength. On the other hand, the frequency response of a Fabry-Perot etalon similarly has, over a limited range of frequencies, a substantially linear time delay with either a positive slope or negative slope. By cascading the dynamically controllable etalon structure with a fiber and properly positioning the etalon frequency response via a feedback control loop, a delay characteristic complementary to that of the fiber can be generated for effectively reducing the effects of fiber dispersion over a certain range of frequencies, i.e., wavelengths.

Figure 1:
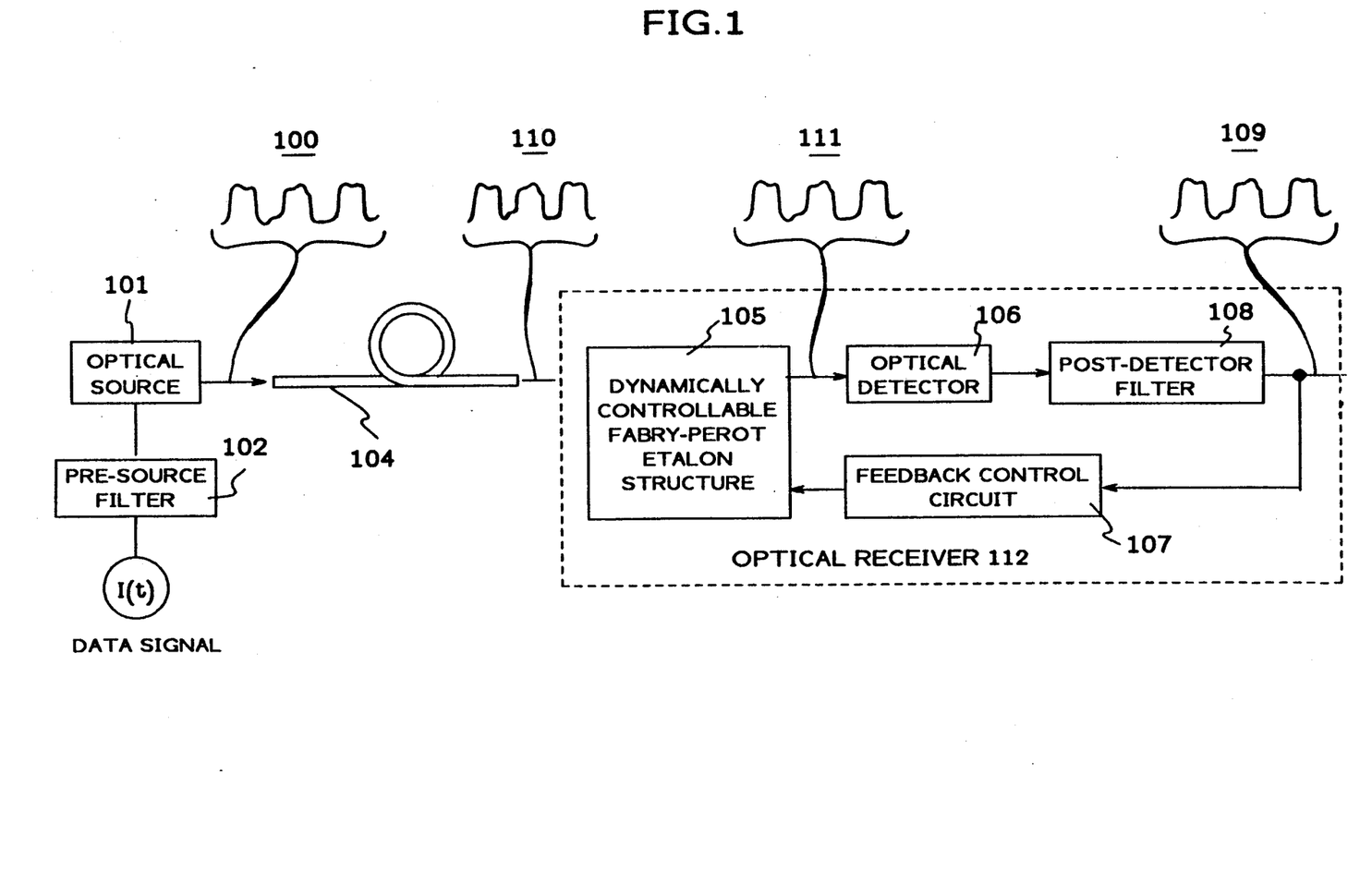
FIG. 1 shows an exemplary ligtwave communication system for illustrating the principles of the invention.

Shown in FIG. 1 is an exemplary block diagram of a lightwave communication system utilizing the present lightwave receiver for optical equalization. It is to be understood, however, that the communication system depicted in FIG. 1 is for the purpose of illustration only and not for the purpose of limitation. As shown in FIG. 1, optical source 101 is a semiconductor laser operating in a single-longitudinal mode which is directly modulated by a current, I(t) of the form:

$$I(t) = I_{bias} + \sum_{k=-\infty}^{\infty} a_k I_p(t - kT_b) \quad (1)$$

where $a_k$ is a data sequence of "0"'s, and "1"'s, $I_p(t)$ is the transmitted current pulse and $1/T_b$ is the signaling bit-rate. Any signaling format, such as return-to-zero (RZ) and non-return-to-zero (NRZ), can be used for transmitting optical signal 100 over a transmission medium. Current waveform, I(t) is shown to be filtered by pre-source filter 102 to account for laser parasitics as well as for pulse shaping of optical signal 100. Pre-source filter 102 may be, for example, a simple RC circuit or the like. The response of optical source 101 to the filtered current waveform is determined by solving the large-signal rate equations, which describe the interrelationship among photon density, carrier density and optical phase within the laser cavity. The resulting electrical field of the laser output, in any case, can be represented as $$E(t) = \sqrt{P(t)} e^{j\phi(t)} \quad (2)$$

where P(t) is the laser facet power and $\phi(t)$ is the laser phase. Furthermore, a simple relationship exists between the wavelength excursion and the time dependence of the optical power output from the laser. The laser chirp, which is the time derivative of the laser phase, is approximately given by:

$$\frac{d\phi}{dt} = -\frac{\alpha}{2}\left(\frac{d}{dt}\ln P(t) + \kappa P(t)\right) \quad (3)$$

where $\alpha$ is the linewidth enhancement factor and $\kappa$ is a parameter dependent on the physical structure of the laser.

For long-haul transmission, the laser output, E(t), is transmitted over single-mode fiber 104 which is L km in length. Modeling fiber 104 as a bandpass filter with a flat amplitude response and a linear group delay, the frequency response is given by:

$$H_f(\omega) = e^{j\frac{L\lambda^2 D\omega^2}{4\pi c}} \quad (4)$$

where D is the fiber dispersion, $\lambda$ is the wavelength, c is the speed of light in free space, and $\omega$ is radian frequency measured from the center frequency of optical source 101. The flat loss of the fiber is irrelevant to this discussion and thus omitted. It should be noted that the slope of the group delay is determined by the chromatic dispersion of fiber 104. Not included in the above description are attenuation and higher-order terms in the phase response. The optical output of fiber 104 is affected by Fabry-Perot etalon structure 105 before passing to optical detector 106, which converts the detected optical signal into an associated electrical signal. It should be noted that optical receiver 112 comprises dynamically controllable etalon structure 105, optical detector 106 and feedback control circuit 107. Feedback control circuit 107 affords a means for adapting the frequency response, $H_{eq}(\omega)$, of etalon structure 105 by measuring a predetermined electrical characteristic of electrical signal 109 and adjusting the etalon frequency response according to a predetermined feedback control strategy so that etalon structure 105 operates at a point on its delay characteristic for producing delay substantially equal and opposite to the associated delay distortion of fiber 104. Furthermore, the electric field output of etalon structure 105 is squared in magnitude by optical detector 106 and passed through post-detector filter 108, which may be omitted. Post-detector filter 108 may be, for example, an $n^{th}$ order Butterworth low-pass filter.

The source-to-detector section consists simply of fiber 104 and etalon structure 105. The impulse response, $h_f(t)$, of fiber 104 alone is of the form $e^{-j\beta t^2}$ where $\beta$ is $\pi c/\lambda^2 DL$. Those skilled in the art will recognize that the phase response is derivable from equation (4) above. In accordance with equation (4), the fiber impulse response, $h_f(t)$, has a constant amplitude with time and a phase variation corresponding to a linear chirp, i.e., quadratic phase response. That is, the phase has a linear frequency variation given by: $v(t) = -(\beta/\pi)t$ Hz.

The overall impulse response $h_{sys}(t)$ of fiber 104 and etalon structure 105 is desired to have the form of a delta function, i.e., "impulsive". This is because if fiber 104 in combination with etalon structure 105 has an impulse response of the form $\delta(t)$, the signal, E(t), propagates unaltered through fiber 104 and etalon structure 105. It is noted that the overall impulse response, $h_{sys}(t)$ is given by $h_{eq}(t) * h_f(t)$ or, in the frequency domain, the overall frequency response, $H_{sys}(\omega)$ is given by $H_{eq}(\omega) \times H_f(\omega)$.

In this particular case, two necessary conditions for approximating an "impulsive" response exist. An additional condition is required if there exists any laser chirp resulting from directly modulating optical source 101. First, there should be one peak of $h_{sys}(t)$ for which the associated fiber chirp frequency is approximately zero. This condition is satisfied by having the first or primary peak of the frequency response close to the time origin and, moreover, is achieved through the proper choice of the frequency shift of $H_{eq}(\omega)$. For example, a simple way to position (frequency shift) the frequency response of etalon structure 105 is to piezoelectrically change the cavity length of an etalon within the structure by a piezoelectric transducer. The change in cavity length required to move the response a full period is half of an optical wavelength. Second, the nominal width of the frequency response's primary peak should be approximately less than a bit period. This is achieved through a judicious selection of the mirrors' reflectivity for a given cavity length of the etalon structure. Third, assuming that laser chirp is present, the chirp frequency associated with each of the other peaks of $h_{sys}(t)$ should be large compared to the largest chirp frequency in the laser pulses. This condition ensures that the convolution of secondary impulse response peaks with the input signal is negligible and, moreover, is achieved by choosing the frequency response period of the etalon structure to be substantially greater than the highest chirp frequency.

Figure 2:
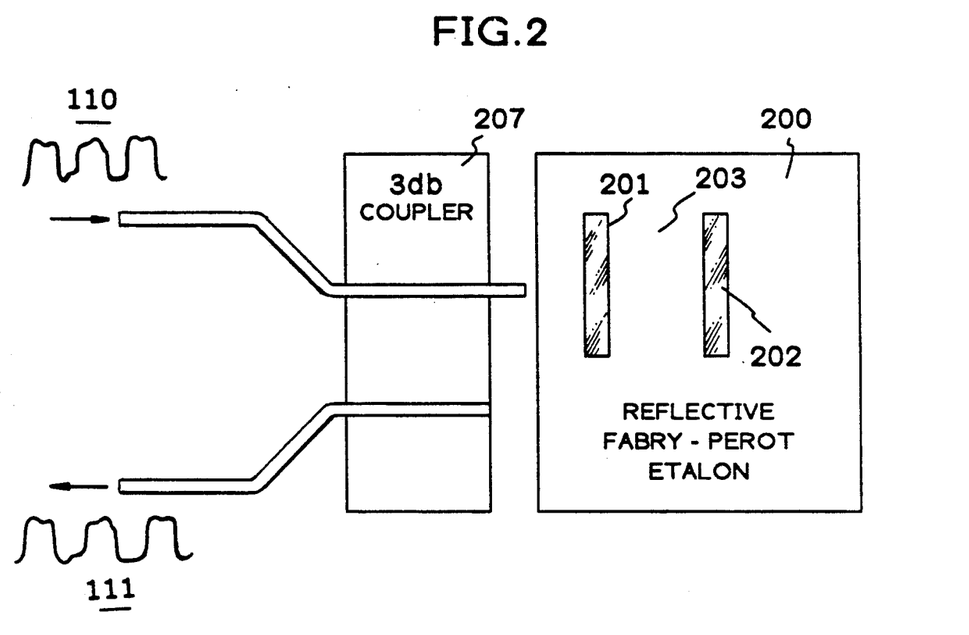
FIG. 2 shows an exemplary embodiment of a reflective Fabry-Perot etalon structure.

In one exemplary embodiment, a reflective single-cavity Fabry-Perot etalon and a piezoelectric transducer may be used as dynamically controllable etalon structure 105. As shown in FIG. 2, back mirror 202 having a reflectivity close to 100% and front mirror 201 having a power reflectivity of $r^2$ in combination with optical medium 203 (refractive index ~1.5) are arranged to form reflective etalon structure 200. Additionally, a piezoelectric transducer (not shown) may be used as the means for dynamically varying the cavity length of etalon 200. Output optical signal 110 from fiber 104 is coupled optically by lenses (not shown) into fiber 205. Reflective etalon 200 reflects optical signal 110 and, moreover, introduces an associated delay into optical signal 110 to generate optical signal 111. Three dB coupler 207 couples optical signal 111 into fiber 206, which directs optical signal 111 to optical detector 106. The reflective etalon and piezoelectric transducer may be implemented as described in U.S. Pat. No. 4,830,451. This reference cited above and its teachings are expressly incorporated herein by reference. In addition, an optical circulator, instead of 3 dB coupler 205, may be used to couple in and out of reflective etalon 200. See, for example, I. Tokohama et al., *Electron Lett.*, Vol. 22, No. 7 pp. 370-2 (1986). The 3 dB coupler implementation although structurally simpler than the circulator design by Tokohama et al. has a higher loss. Other implementations for reflective etalon structures, such as those comprising more than one reflective etalon, may be used instead of a single cavity reflective etalon structure, see R. C. Alferness et al., *Electron Lett.*, Vol. 24, No. 3, pp. 150-1 (1988)

Figure 3:
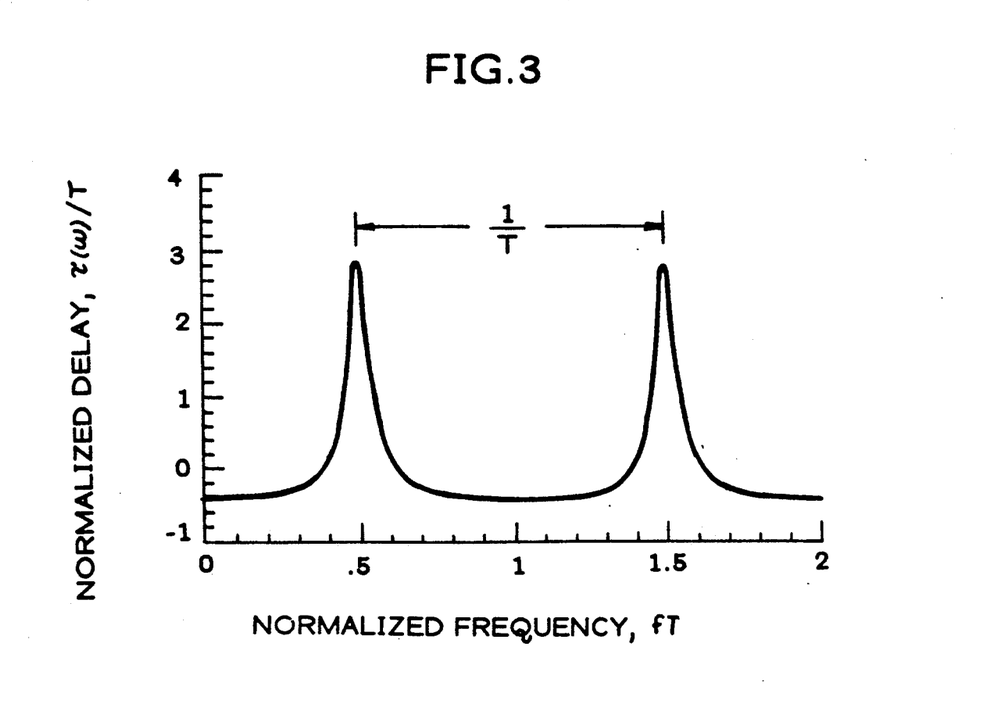
FIG. 3 shows the normalized delay response of the etalon structure shown in FIG. 2.

In all these reflective etalons, however, the frequency responlse, $H_{eq}(\omega)$, is given by:

$$H_{eq}(\omega) = A\left(\frac{1 + re^{j\omega T}}{1 + re^{-j\omega T}}\right) \tag{5}$$

$$= Ae^{j\psi(\omega)}$$

$$\psi(\omega) = 2\tan^{-1}\left(\frac{r\sin\omega T}{1 + r\cos\omega T}\right) \tag{6}$$

where T is the round-trip delay time of the cavity, and A is a constant representing the loss of the structure. As shown in FIG. 3, the normalized delay response, $\tau(\omega)/T$, is found to be periodic in frequency with a period of 1/T Hz and, moreover, from the above equation is given by:

$$\tau(\omega) = -\frac{d\psi(\omega)}{d\omega} \tag{7}$$

$$= -2rT\left(\frac{r + \cos\omega T}{1 + r^2 + 2r\cos\omega T}\right)$$

It is contemplated that the linear portion of the delay response would be used to counter the delay dispersion of fiber 104. It should be noted that the delay response of etalon 200 should have the appropriate polarity and magnitude to counteract the delay response of the fiber.

When RZ signaling is used for the communication system shown in FIG. 1, electrical signal 109 contains a sinusoidal component at the signaling bit-rate $1/T_b$ of optical signal 100. One exemplary method of adaptively controlling the frequency response of etalon 200 is to position the frequency response so as to maximize the amplitude of this sinusoidal component. Such a method approximately corresponds to the narrowest, best-equalized output electrical signal 109. This can be achieved by feedback control circuit 107 periodically measuring the amplitude of the sinusoidal component of electrical signal 109 and using the relative change from previous measurements as a control signal for changing the cavity length of etalon 200 via the piezoelectric transducer. While maximizing the amplitude of the frequency component of electrical signal 109 at the signaling frequency, $1/T_b$, may be used as a feedback control strategy, it cannot be used in the case of NRZ signaling. This is because for NRZ signaling, electrical signal 109 contains no frequency component at the signaling bit-rate. However, other feedback control strategies may be used. For NRZ signaling, the "eye opening" versus frequency profile has a convex shape. Thus, one method of adaptively controlling the frequency response of etalon 200 is to position the frequency response of the etalon so as to maximize the "eye opening" of electrical signal 109.

Figure 4:
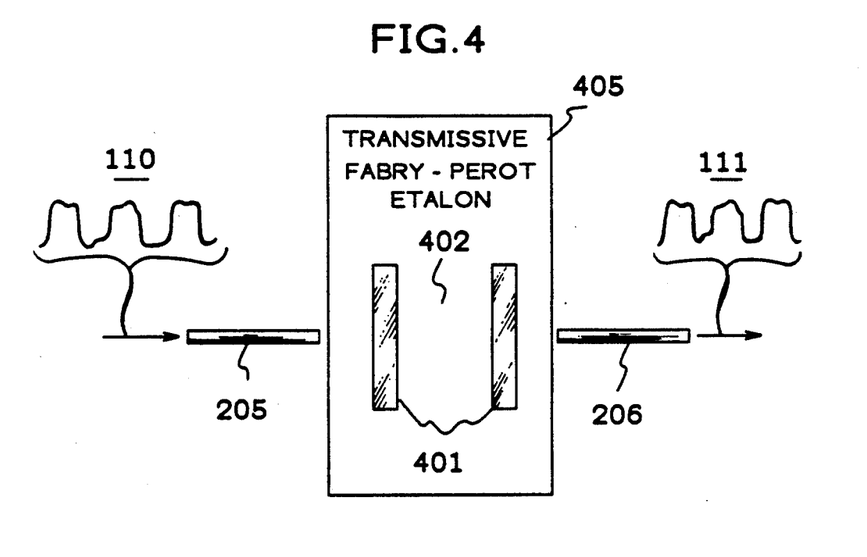
FIG. 4 shows an exemplary embodiment of a transmissive Fabry-Perot etalon structure.

In another exemplary embodiment, instead of using reflective Fabry-Perot etalon structures, transmissive etalon structures may be used that utilize a simple, single cavity transmissive etalon, shown in FIG. 4. For transmissive etalon 405, the frequency response is given by:

$$H_{eq}(\omega) = \left(\frac{1 - r^2}{(1 + r^4 - 2r^2\cos\omega T)^{\frac{1}{2}}}\right)e^{j\psi(\omega)} \tag{8}$$

where the phase response is:

$$\psi(\omega) = -\tan^{-1}\left(\frac{r^2\sin\omega T}{1 - r^2\cos\omega T}\right) \tag{9}$$

and the corresponding delay response is $$\tau(\omega) = r^2 T\left(\frac{\cos\omega T - r^2}{1 + r^4 - 2r^2\cos\omega T}\right) \tag{10}$$

Figure 5:
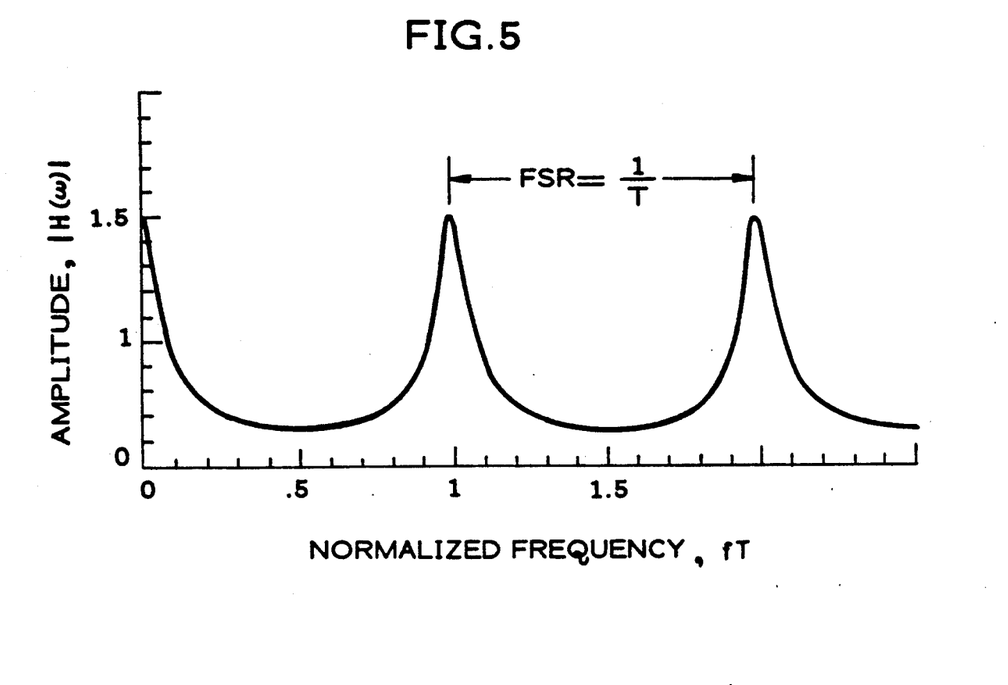
FIGS. 5-6 show the amplitude and delay characteristics of the transmissive etalon structure shown in FIG. 4.
Figure 6:
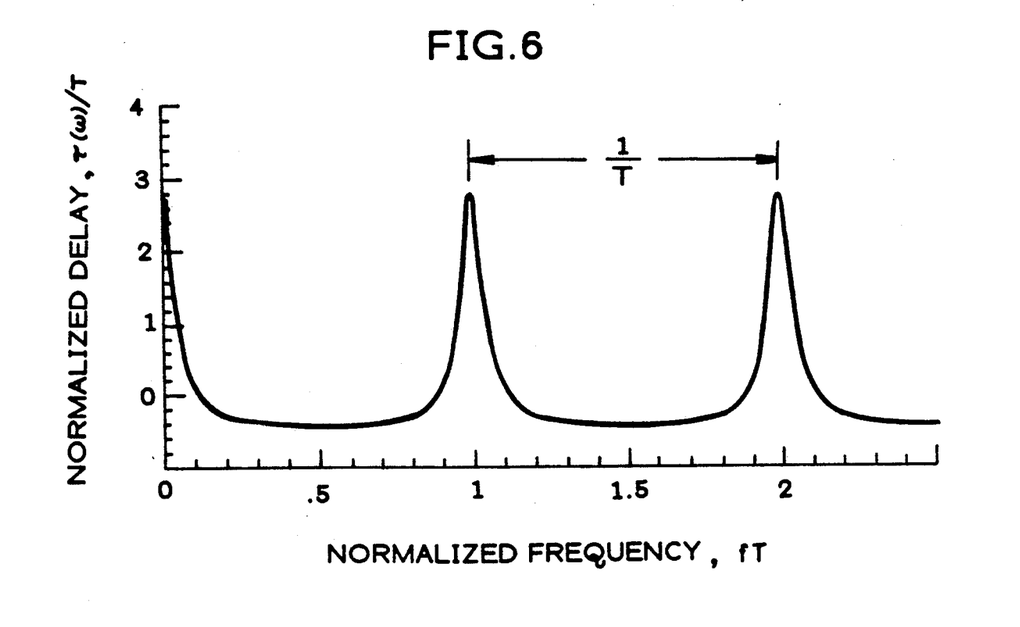

Similar to the previous reflective etalon, $r^2$ is the power reflectivity of mirrors 401, T is the round-trip delay of the cavity and the free spectral range (FSR) is simply given by 1/T. It should also be noted that optical medium 402 is enclosed within mirrors 401. Illustrative amplitude and delay characteristics for this Fabry-Perot etalon are shown in FIGS. 5–6.

For transmissive Fabry-Perot etalon structures, a simple feedback control strategy may be employed and that is to center the optical signal spectrum of optical signal 110 at the peak of the etalon transmission response. This can be accomplished by maximizing the dc power detected in electrical signal 109. Furthermore, this feedback control strategy works for both NRZ as well as RZ signaling.

In an example from computer simulation, optical signal 100 (signaling bit-rate ~8 Gbs/sec) was modeled by numerically integrating the large-signal rate equations using the following parameters in which optical source 101 was modeled as a distributed feedback buried heterostructure laser: $\lambda = 1.5$ μm; $W = 1.5$ μm; $\Gamma_v = 0.4$; $N_t = 1 \times 10^{16} \text{cm}^{-3}$; $\tau_{ph} = 1.4\text{ps}$; $\tau_e = 1.0\text{ns}$; $\beta_{sp} = 3.9 \times 10^{-4}\text{cm/s}$; $v_g = 7.9 \times 10^9 \text{cm/s}$; $C = 10.0 \text{cm}^2/\text{s}$; $a = 2.5 \times 10^{-6} \text{cm}^3/\text{s}$; $\epsilon = 1.5 \times 10^{-17} \text{cm}^{-3}$; $\alpha = -6$; $P_{max} = 8.3\text{mW}$; and $P_{min} = 1.7\text{mW}$. Here, $\lambda$ is the wavelength, W is the width of the active layer, $\Gamma_v$ is the mode confinement factor in the vertical direction, $N_t$ is the carrier density required for transparency, $\tau_{ph}$ is the photon lifetime, $\tau_e$ is the carrier lifetime, $\beta_{sp}$ is the fraction of spontaneous emission into the lasing mode, $v_g$ is the group velocity, C is the carrier diffusion coefficient, a is the gain coefficient, $\epsilon$ is the gain compression coefficient, $P_{max}$ is the maximum power output; and $P_{min}$ is the minimum power output.

Pre-source filter 102 in the laser driver circuit had a 3 dB bandwidth of 4 GHz, while post-detector filter 109 had a bandwidth of 6.24 GHz, corresponding to $0.78/T_b$ where $T_b$ is the signaling period. In addition, fiber 104 had a dispersion, D, of ~17 ps/nm/km. Optical signal 100 was generated using a maximal-length pseudorandom sequence of length 64 which contained all bit sequences of length 6.

Figure 7:
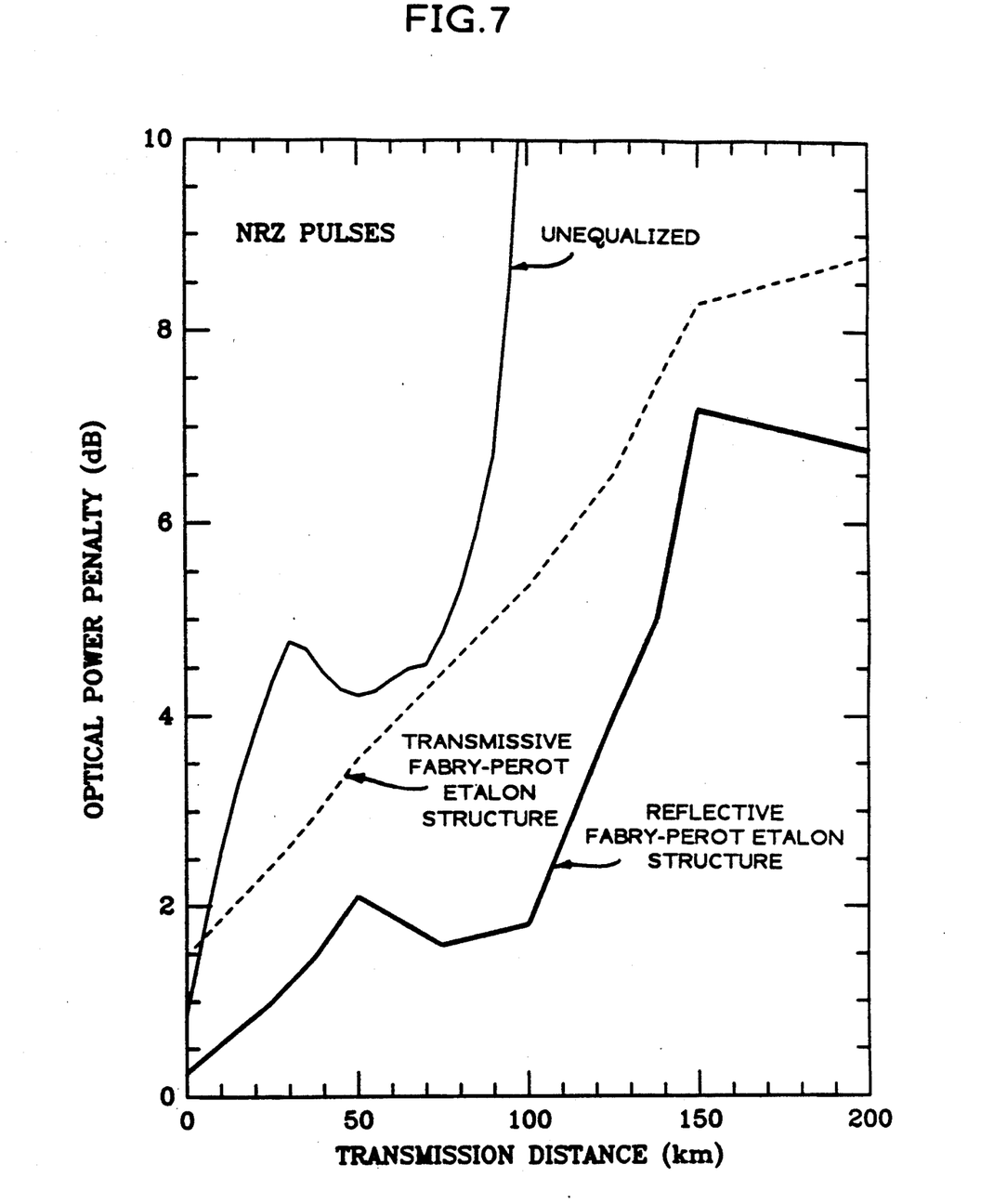
FIGS. 7-9 show the optical power penalty versus transmission distance for various etalon structures as compared to an unequalized communication system.
Figure 8:
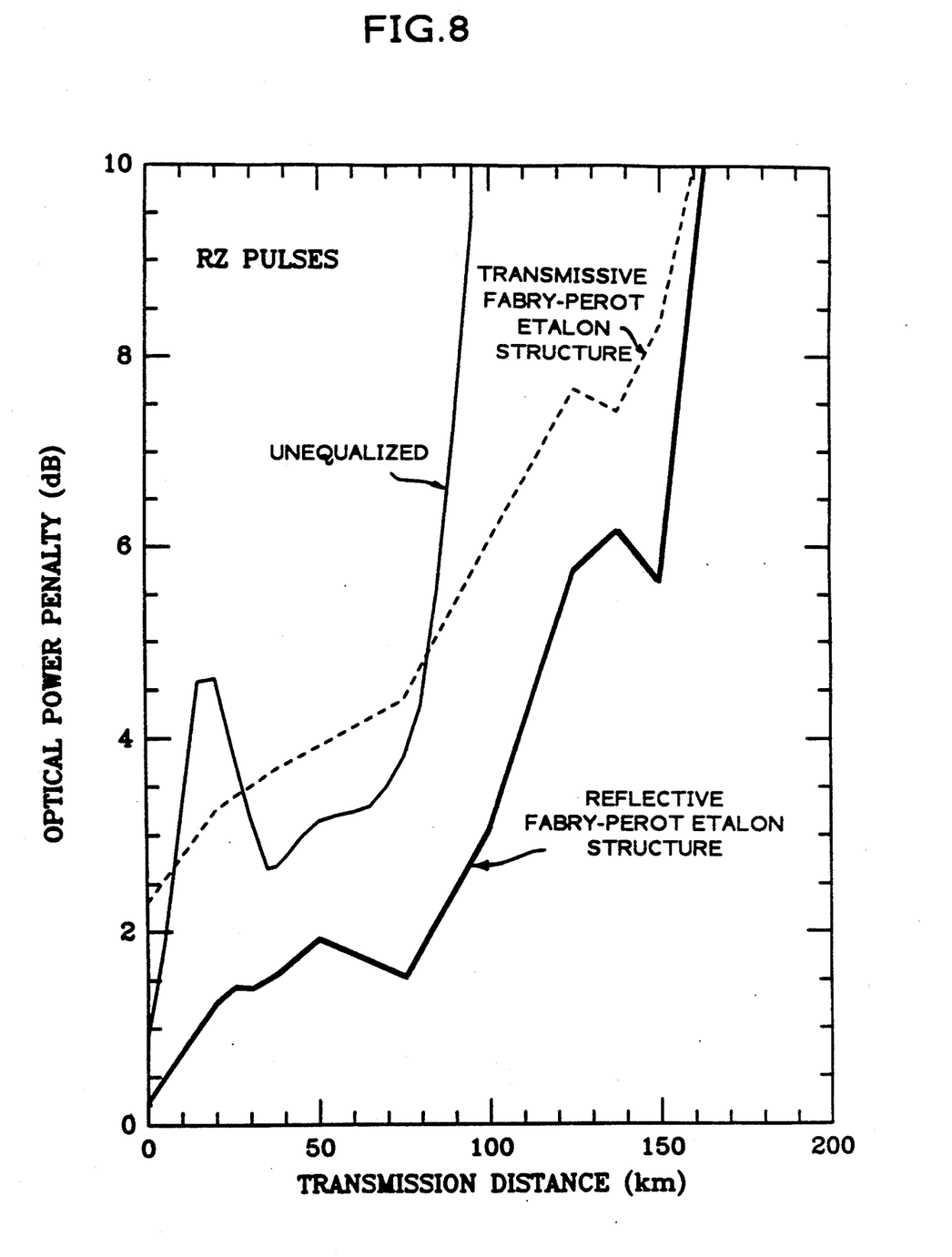
Figure 9:
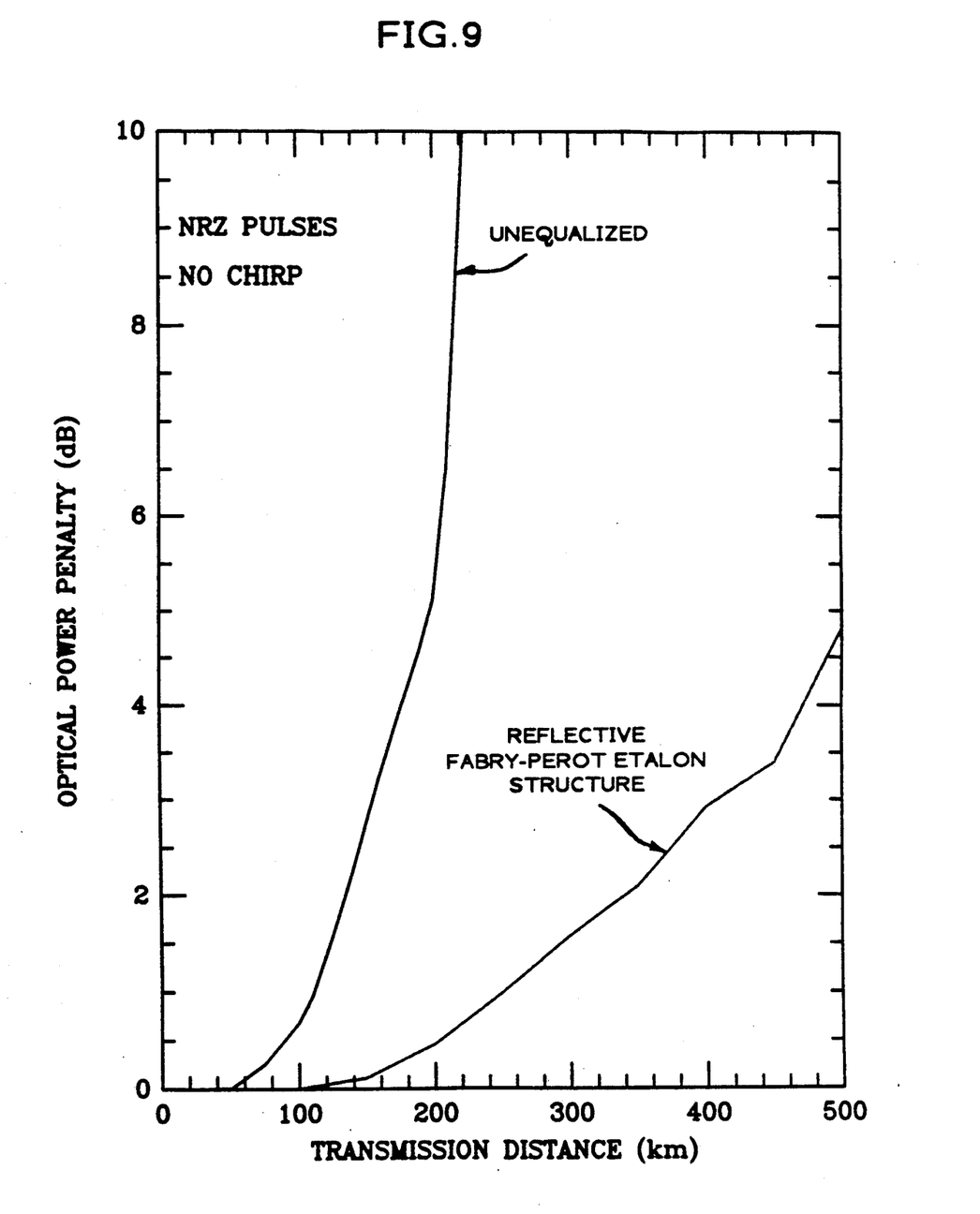

Shown in FIGS. 7, 8 and 9 are the performance results. It should be noted that these results demonstrate typical improvements that may be obtained by utilizing the present optical equalization receiver. The results show optical signal power penalty versus transmission distance for both NRZ and RZ signaling. In both cases, the optical penalty for an unequalized system is compared to those systems utilizing both reflective and transmissive Fabry-Perot etalon structures. The results in FIGS. 7 and 8 include the effects of laser chirp, while FIG. 9 does not.

Reflectivity, r, and cavity delay, T, were chosen based on conditions two and three stated hereinabove for obtaining an "impulsive" response. Furthermore, for achieving condition one, the etalon phase response has been positioned by searching over an entire period of the delay characteristic of electrical signal 109 to find that position yielding the maximum "eye opening". The positioning of the phase response results in reducing the fiber delay distortion. In general, sustaining a specified linear phase response over a specified signal bandwidth is not possible regardless of the values of r and T. Nevertheless, the equalization receiver can still provide increased system performance as measured by the optical signal power penalty. Here, the optical penalty is defined as the "eye opening" relative to the case of a fiber having a length zero and no post-detector filter present. The optical penalty measured at the output of post-detector filter 108 includes chromatic dispersion of the fiber, laser bandwidth limitations and nonlinearities, and receiver bandwidth limitations.

In the case of NRZ signaling, the following etalon structures were employed: a reflective etalon having a reflectivity of $r = 0.82$ and a roundtrip delay time of $T = 12.5$ ps; and a transmissive etalon having a reflectivity of $r = 0.86$ and a round trip delay of $T = 12.5$ ps. For the transmissive etalon, the parameters correspond to a free spectral range of 80 GHz and a 3 dB bandwidth of 7.6 GHz. Additionally, the choice of r and T are near-optimal. Particularly, r and T were chosen to minimize the optical power penalty for a specific length of fiber, namely, $L = 100$ km. The use of equalization significantly extended the range of "eye-open" operation. For example, FIG. 7 shows that optical equalization can maintain an "open eye" at distances more than twice those distances at which the unequalized system becomes inoperable. For RZ signaling (duty cycle ~0.75), similar results were obtained, see FIG. 8. In this case, the reflective etalon structure had the parameters $r = 0.78$ and $T = 12.5$ ps while the transmissive etalon structure had the parameters $r = 0.82$ and $T = 12.5$ ps. Although, the improvements are not as substantial as for NRZ signaling, the "eye opening" still remains open for a distance much greater that 100 km.

The results for optical power penalty shown in FIGS. 7–8 do not account for structural losses, which range from ~2 dB to 6 dB. These losses, along with the fiber attenuation, must be taken into consideration in determining the permissible transmission distance.

FIG. 9 shows that in a communication system without laser chirp, utilizing a receiver comprising a controllable reflective etalon structure, the effects of dispersion alone can also be substantially reduced, increasing the achievable transmission distance by at least a factor of two.

Figure 10:
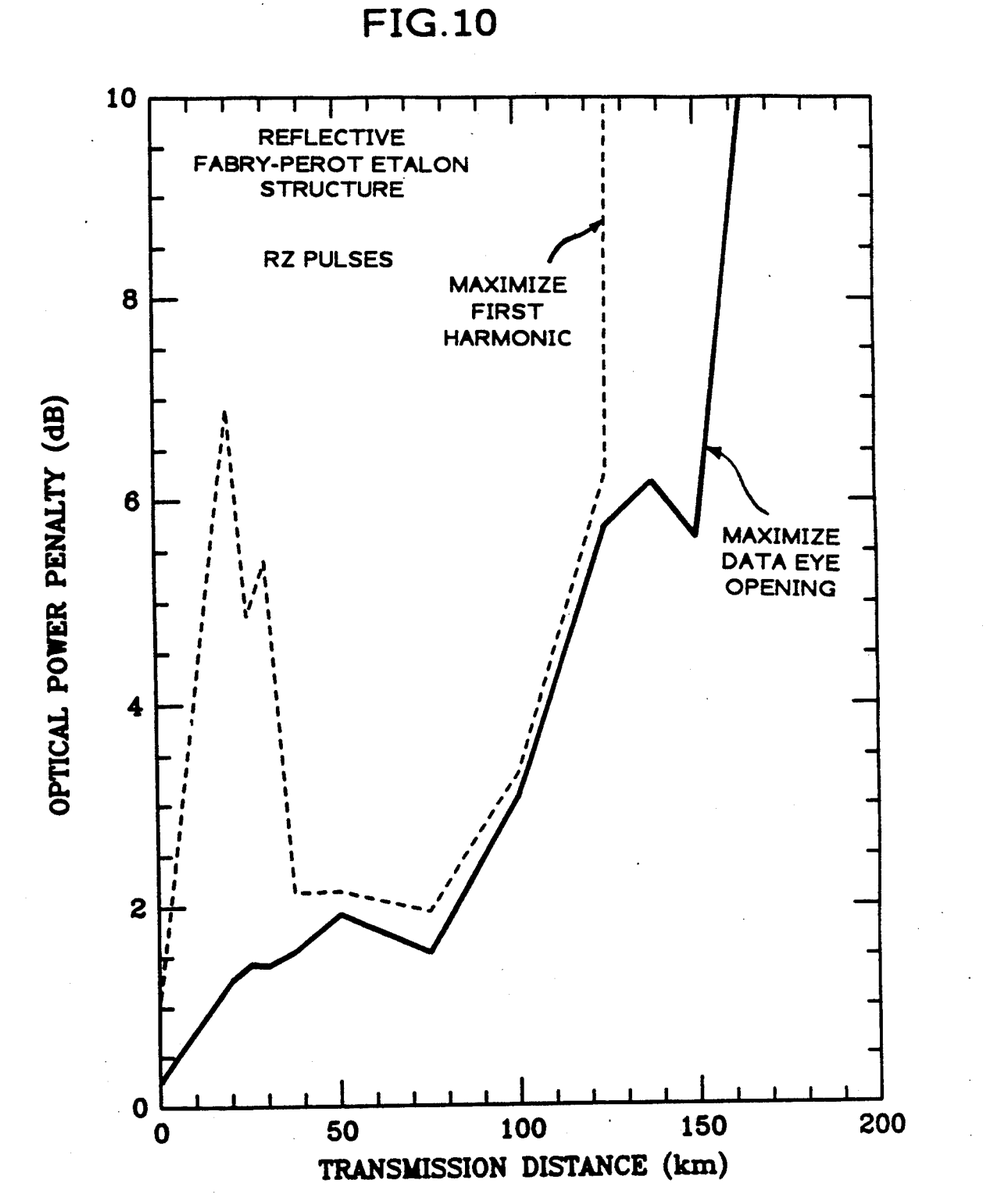
FIGS. 10 through 12 show the optical power penalty versus transmission distance for different feedback control strategies.
Figure 11:
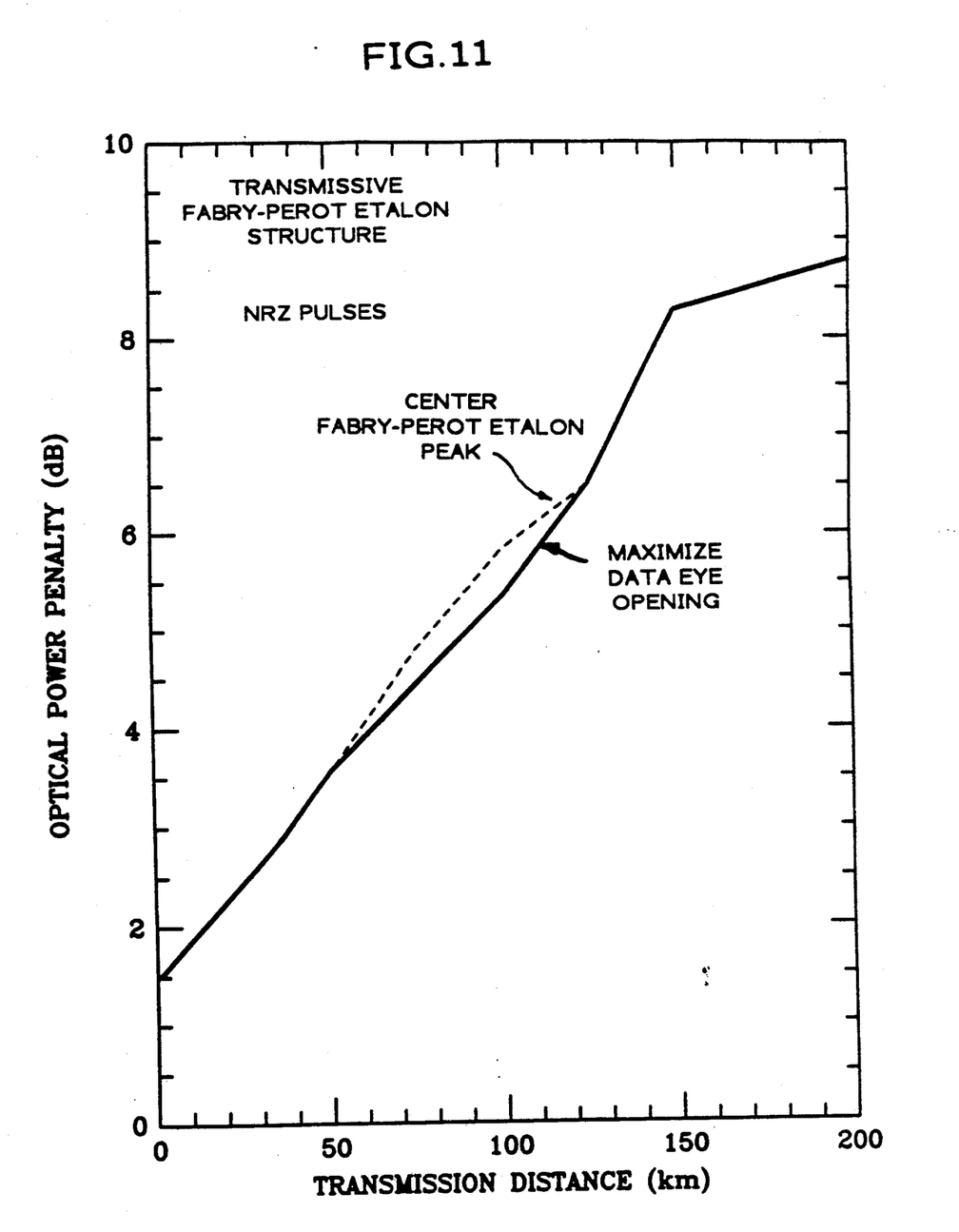
Figure 12:
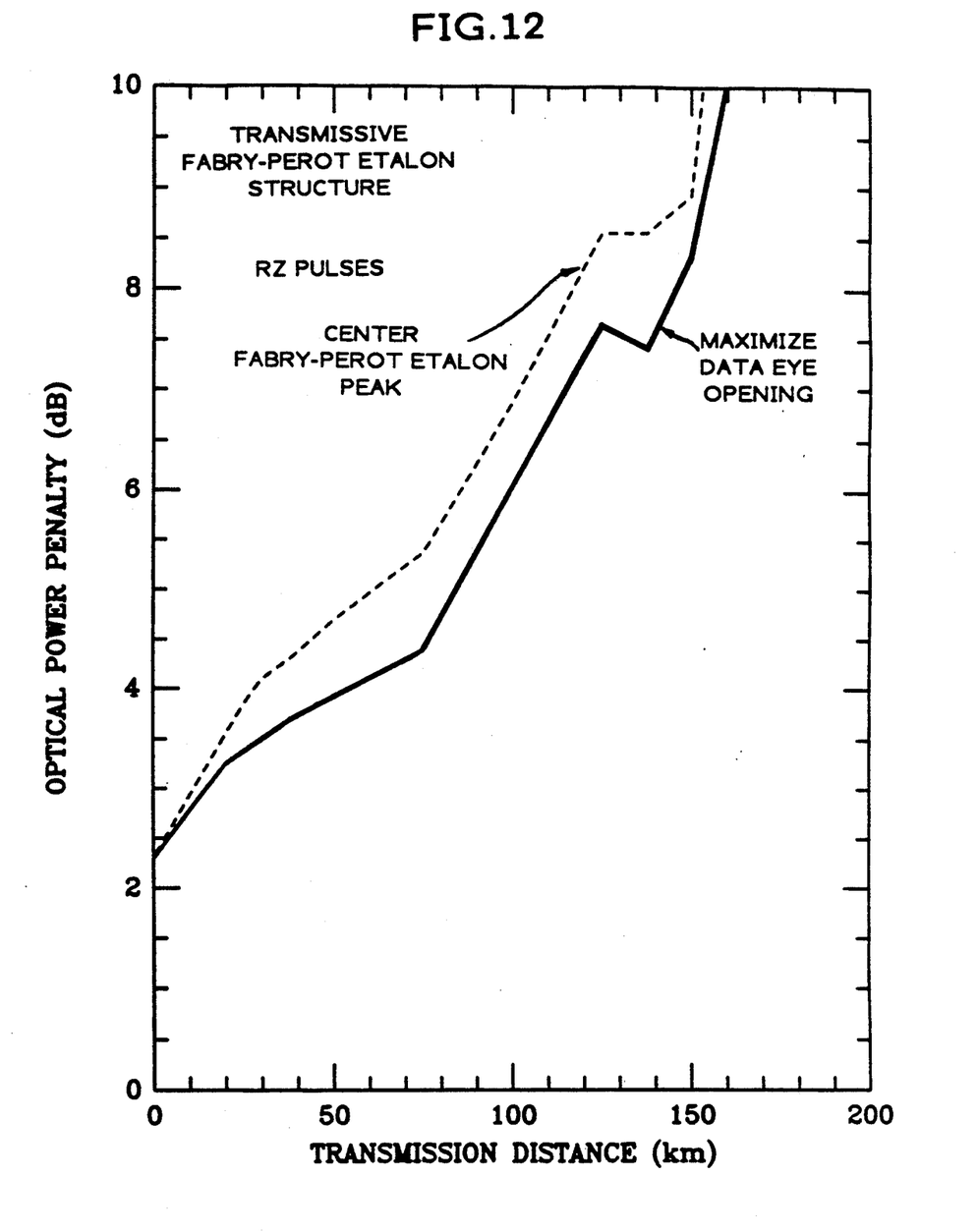

FIGS. 10 through 12 show the performance in terms of optical power penalty versus transmission distance for different control feedback strategies used in positioning the frequency response of the etalon structure. It should be recalled that for the reflective etalon structure and the case of RZ signaling, one possible feedback control strategy is to maximize the dc power of electrical signal 109 at the bit-rate frequency, i.e., maximize the first harmonic peak. However, another control strategy is to maximize the "eye opening" of electrical signal 109. Either control strategy is accomplished by adjusting the cavity length of the etalon via the piezoelectric transducer by feedback control circuit 107, which is well known in the prior art. Feedback control circuit 107 may utilize differentiators, decision circuits, band-pass filters, integrate and dump circuits, envelope detectors and the like for measuring the "eye opening", dc power, or an sinusoidal amplitude component of electrical signal 109. FIG. 10 indicates that maximizing the first harmonic peak works reasonably well for distances from 40 km to about 120 km. For transmissive etalon structures, the etalon response is centered on the center optical frequency of optical signal 110, i.e., at the Fabry-Perot transmission peak. As indicated by FIGS. 11 and 12, this feedback control strategy works well for both RZ and NRZ signaling.

Additional results show that the performance of the lightwave receiver is not very sensitive to variations in the reflectivity or the round trip delay time of the etalon. For example, the optical signal power penalty varies only 0.5 dB for round trip delays between 10 ps and 25 ps. This assumes a fiber length of 100 km, and a reflective etalon structure with reflectivity, r, of 0.74. Also, the optical signal power penalty varies less than 0.2 dB for reflectivities between 0.74 and 0.82 for a fixed round trip delay of 12.5 ps.

With consideration to the bandwidth of post-detector filter 108, it was found that the performance of both unequalized and equalized transmission systems was sensitive to the type of post-detector filter and, moreover, its bandwidth. In the results presented, post-detector filter 108 had a bandwidth of 6.24 GHz. For RZ signaling, further computer simulation indicated that increasing the filter bandwidth to 7.55 GHz (r reoptimized to 0.74) reduced the optical power penalty from 3.0 dB to 2.26 dB. Also, different laser parameters could alter the optical power penalty for the given system parameters.

While a single signaling bit-rate, B, was used for the data generated, it is anticipated that the product $B^2 \cdot L$ will be approximately constant for a given optical power penalty. Referring to FIGS. 7 and 8 when some method of optical equalization was employed, the product $B^2 \cdot L$ increased, for NRZ signaling, from 6400 $(Gb/s)^2 \cdot km$ to better than 25600 $(Gb/s)^2 \cdot km$ and, for RZ signaling, from 5760 $(Gb/sec)^2 \cdot km$ to better than 10240 $(Gb/sec)^2 \cdot km$. Thus, for example, at a signaling bit-rate of 16 Gb/s, the unequalized system will be inoperable above 25 km, while an equalized system should maintain an "open eye" pattern for fiber lengths greater than 50 km.

With respect to timing recovery and threshold considerations, the midpoint of the "eye opening" may be attained as the threshold setting since it corresponds approximately to the average dc power level at optical detector 106. Furthermore, for the case of RZ signaling, the frequency component at the signaling frequency of electrical signal 109 may be used to derive the sampling phase for optical detector 106.

Various other modifications may be made by those skilled in the art which will embody the principles of the invention and fall within the spirit and the scope thereof. For instance, multiple cavity etalon structures may be used instead of a single cavity structure. See, for example, A. A. M. Saleh et al., *Journal of Lightwave Technology*, Vol. 7, No. 2 pp. 323-30 (1989). Theoretically, these multiple structures should improve the system's performance. Also, the frequency response of the various etalon structures may be adjusted in accordance with the above feedback strategies by inducing a change in the refractive index of the optical medium enclosed within the etalon cavity.

We claim:

1. A lightwave receiver responsive to a lightwave signal from a transmission medium, said lightwave signal including a delay distortion component introduced by said transmission medium, said lightwave receiver comprising:

a Fabry-Perot etalon having first and second opposing ends for filtering said lightwave signal to produce a filtered output signal at said first opposing end;

means coupled to said Fabry-Perot etalon for dynamically varying an optical path length of said Fabry-Perot etalon in response to a control signal, wherein a variation of said optical path length causes a corresponding change in a delay characteristic for said Fabry-Perot etalon; and feedback control means responsive to the delay distortion component in said filtered output signal for generating said control signal to cause said delay characteristic for said Fabry-Perot etalon to substantially compensate said delay distortion component for equalization of said lightwave signal.

2. The lightwave receiver as defined in claim 1 wherein said means coupled to said Fabry-Perot etalon includes a piezoelectric transducer.

3. The lightwave receiver as defined in claim 1 wherein said feedback control means comprises:

detecting means responsive to said filtered output signal for generating a corresponding electrical signal; and means for measuring a sinusoidal amplitude component of said electrical signal for generating said control signal, wherein said control signal causes said means coupled to said Fabry-Perot etalon to vary said optical path length such that said sinusoidal amplitude component is substantially maximized.

4. The lightwave receiver as defined in claim 1 wherein said feedback control means comprises:

detecting means responsive to said filtered output signal for generating a corresponding electrical signal; and means for measuring an eye opening of said electrical signal for generating said control signal, wherein said control signal causes said means coupled to said Fabry-Perot to vary said optical path length such that said eye opening is substantially maximized.

5. The lightwave receiver as defined in claim 1 wherein said feedback control means comprises:

detecting means responsive to said filtered output signal for generating a corresponding electrical signal; and means for measuring the dc power of said electrical signal for generating said control signal, wherein said control signal causes said means coupled to said Fabry-Perot etalon to vary said optical path length such that the dc power of said electrical signal is substantially maximized.

6. The lightwave receiver as defined in claim 3 or 4 wherein said first and second opposing ends include first and second surfaces, respectively, said first surface having a reflectivity less than 1 and said second surface having a reflectivity substantially equal to 1.

7. The lightwave receiver as defined in claim 3, 4, or 5 wherein said first and second opposing ends include first and second surfaces, respectively, said first and second surfaces each having a reflectivity less than 1.

8. A lightwave communication system comprising a lightwave transmitter, a lightwave receiver and a transmission medium optically coupled jointly to said lightwave transmitter and said lightwave receiver for supporting a lightwave signal therebetween, said lightwave receiver responsive to said lightwave signal, wherein said lightwave signal includes a delay distortion component introduced by said transmission medium, said lightwave receiver comprising:

a Fabry-Perot etalon having first and second opposing ends for filtering said lightwave signal to produce a filtered output signal at said first opposing end;

means coupled to said Fabry-Perot etalon for dynamically varying an optical path length of said Fabry-Perot etalon in response to a control signal, wherein a variation of said optical path length causes a corresponding change in a delay characteristic for said Fabry-Perot etalon; and feedback control means responsive to the delay distortion component in said filtered output signal for generating said control signal to cause said delay characteristic for said Fabry-Perot etalon to substantially compensate said delay distortion component for equalization of said lightwave signal.

9. The lightwave communication system as defined in claim 8 wherein said means coupled to said Fabry-Perot etalon includes a piezoelectric transducer.

10. The lightwave communication system as defined in claim 8 wherein said feedback control means comprises:

detecting means responsive to said filtered output signal for generating a corresponding electrical signal; and means for measuring a sinusoidal amplitude component of said electrical signal for generating said control signal, wherein said control signal causes said means coupled to said Fabry-Perot etalon to vary said optical path length such that said sinusoidal amplitude component is substantially maximized.

11. The lightwave communication system as defined in claim 8 wherein said feedback control means comprises:

detecting means responsive to said filtered output signal for generating a corresponding electrical signal; and means for measuring an eye opening of said electrical signal for generating said control signal, wherein said control signal causes said means coupled to said Fabry-Perot to vary said optical path length such that said eye opening is substantially maximized.

12. The lightwave communication system as defined in claim 8 wherein said feedback control means comprises:

detecting means responsive to said filtered output signal for generating a corresponding electrical signal; and means for measuring the dc power of said electrical signal for generating said control signal, wherein said control signal causes said means coupled to said Fabry-Perot etalon to vary said optical path length such that the dc power of said electrical signal is substantially maximized.

13. The lightwave communication system as defined in claim 10 or 11 wherein said first and second opposing ends include first and second surfaces, respectively, said first surface having a reflectivity less than 1 and said second surface having a reflectivity substantially equal to 1.

14. The lightwave communication system as defined in claim 10, 11, or 12 wherein said first and second opposing ends include first and second surfaces, respectively, said first and second surfaces each having a reflectivity less than 1.

* * * * *